United States Patent
Lau et al.

(10) Patent No.: US 9,088,585 B2
(45) Date of Patent: Jul. 21, 2015

(54) SELECTION OF NETWORK-TO-NETWORK INTERFACE DEVICE

(75) Inventors: Priscilla Lau, Fremont, CA (US); John Bittenbender, Bloomsburg, PA (US); Robin Clair, Flower Mound, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 400 days.

(21) Appl. No.: 13/535,411

(22) Filed: Jun. 28, 2012

(65) Prior Publication Data

US 2014/0006629 A1    Jan. 2, 2014

(51) Int. Cl.
*H04L 29/06* (2006.01)
*H04L 29/08* (2006.01)

(52) U.S. Cl.
CPC .......... *H04L 65/1033* (2013.01); *H04L 67/146* (2013.01); *H04L 65/1006* (2013.01); *H04L 65/1016* (2013.01); *H04L 67/147* (2013.01); *H04L 67/306* (2013.01)

(58) Field of Classification Search
CPC .............. H04L 65/1033; H04L 67/146; H04L 65/1016; H04L 67/306; H04L 67/147; H04L 63/1006
USPC .......................... 370/389, 392, 395.21, 395.3
See application file for complete search history.

(56) References Cited

U.S. PATENT DOCUMENTS

| | | | |
|---|---|---|---|
| 7,486,684 B2 * | 2/2009 | Chu et al. ...................... 370/401 |
| 8,040,901 B1 * | 10/2011 | Kompella et al. ........ 370/395.71 |
| 8,194,535 B2 * | 6/2012 | Kodialam et al. ............. 370/217 |
| 2008/0056151 A1 * | 3/2008 | Gazier et al. .................. 370/252 |

* cited by examiner

*Primary Examiner* — Mohammad Anwar (57) ABSTRACT

Methods, devices, and storage mediums for receiving, by an ingress network-to-network interface device, a signaling message to establish a communication session; adding an identifier that identifies the ingress network-to-network interface device; transmitting the signaling message that includes the identifier to another device of a network with which the ingress network-to-network interface device belongs; selecting an egress network-to-network interface device based on the identifier and a minimum path criterion between the ingress network-to-network interface device and the egress network-to-network interface device; and transmitting the signaling message to the egress network-to-network interface device.

23 Claims, 8 Drawing Sheets

SELECTION OF NETWORK-TO-NETWORK INTERFACE DEVICE

BACKGROUND

As carriers deploy Internet Protocol Multimedia Subsystem (IMS) networks or other IP-based networks to support various services, such as, telephone, messaging, etc., carriers may interconnect the IMS network or other IP-based network with other networks using network-to-network interface (NNI) devices. NNI devices provide interfaces between multiple networks, which may belong to the same service provider, different service providers, use different technologies, etc.

DETAILED DESCRIPTION

The following detailed description refers to the accompanying drawings. The same reference numbers in different drawings may identify the same or similar elements.

According to an exemplary embodiment, a network-to-network interface device adds an identifier to a message, received from another network, before transmitting the message to a device (e.g., for processing) in the network in which the network-to-network interface device resides. According to an exemplary embodiment, the identifier uniquely identifies the network-to-network interface device. The identifier may be implemented as a string (e.g., a character string, a numerical string, an alphanumeric string, or some other type of string). By way of further example, the string may be implemented as a name (e.g., a common name, a fully qualified domain name, etc.), a number (e.g., a telephone number, a device identifier, etc.), a device address (e.g., a MAC address), a network address (e.g. a routing number, an IP address, etc.), etc.

According to an exemplary embodiment, a device uses the identifier of a network-to-network interface device to route a message that terminates outside of a network in which the device resides. According to an exemplary embodiment, the device uses the identifier to select an egress network-to-network interface device that minimizes the physical distance of a signaling path, minimizes the physical distance of a media path, optimizes other network performance metrics, and/or optimizes the use of network resources. By way of example, the device may be implemented as a call session control function (CSCF) device in an IMS network. Alternatively, the device may be implemented in some other network element of the IMS network or a network element of another IP-based network.

According to an exemplary embodiment, the device selects the egress network-to-network interface device based on routing information that is correlated to the identifier of the ingress network-to-network interface device. The routing information and the identifier may be pre-configured by the network provider or made available by other methods that are outside the scope of this description. The routing information and the identifier may be stored by the device or stored by another device that is accessible to the device.

According to another embodiment, the device uses the identifier to select an egress network-to-network interface device that minimizes the physical distance of the connection between the egress network-to-network interface device in the originating network to the ingress network-to-network interface device in a terminating network.

According to an exemplary scenario, assume an ingress network-to-network interface device of an IMS network receives a Session Initiation Protocol (SIP) Invite message from another network to establish a communication session (e.g., a Voice-over Internet Protocol (VoIP) call, etc.). The ingress network-to-network interface device adds a SIP header that includes a unique identifier that identifies the ingress network-to-network interface device. The ingress network-to-network interface device transmits the SIP Invite message, which includes the identifier, to another device(s) in the IMS network for further processing.

Further to this scenario, a device in the IMS network determines where the requested communication session (e.g., a VoIP call, etc.) should be terminated. For example, the device may determine whether the requested communication session should be terminated in the originating network, another network, or within the IMS network. If the device determines that the requested communication session should be terminated to the originating network or another network, the device uses the identifier to select an egress network-to-network interface device located in the IMS network. For example, the device uses the identifier to select an egress network-to-network interface device that minimizes the physical distance of the signaling path, minimizes the physical distance of the media bearer path, optimizes performance metrics, and/or optimizes network resource usages pertaining to the communication session. In some cases, the device may select the ingress network-to-network interface device to serve as the egress network-to-network interface device. In other cases, the device may select another network-to-network interface device of the IMS network to serve as the egress network-to-network interface device.

While exemplary embodiments provided in this description may be implemented based on the use of a particular protocol, network architecture, platform, etc., such implementations are not intended to be restrictive or provide an exhaustive treatment, as such. In other words, the embodiments described herein may be implemented using other suitable protocols, network architectures, platforms, etc., which may not be specifically described.

Figure 1:
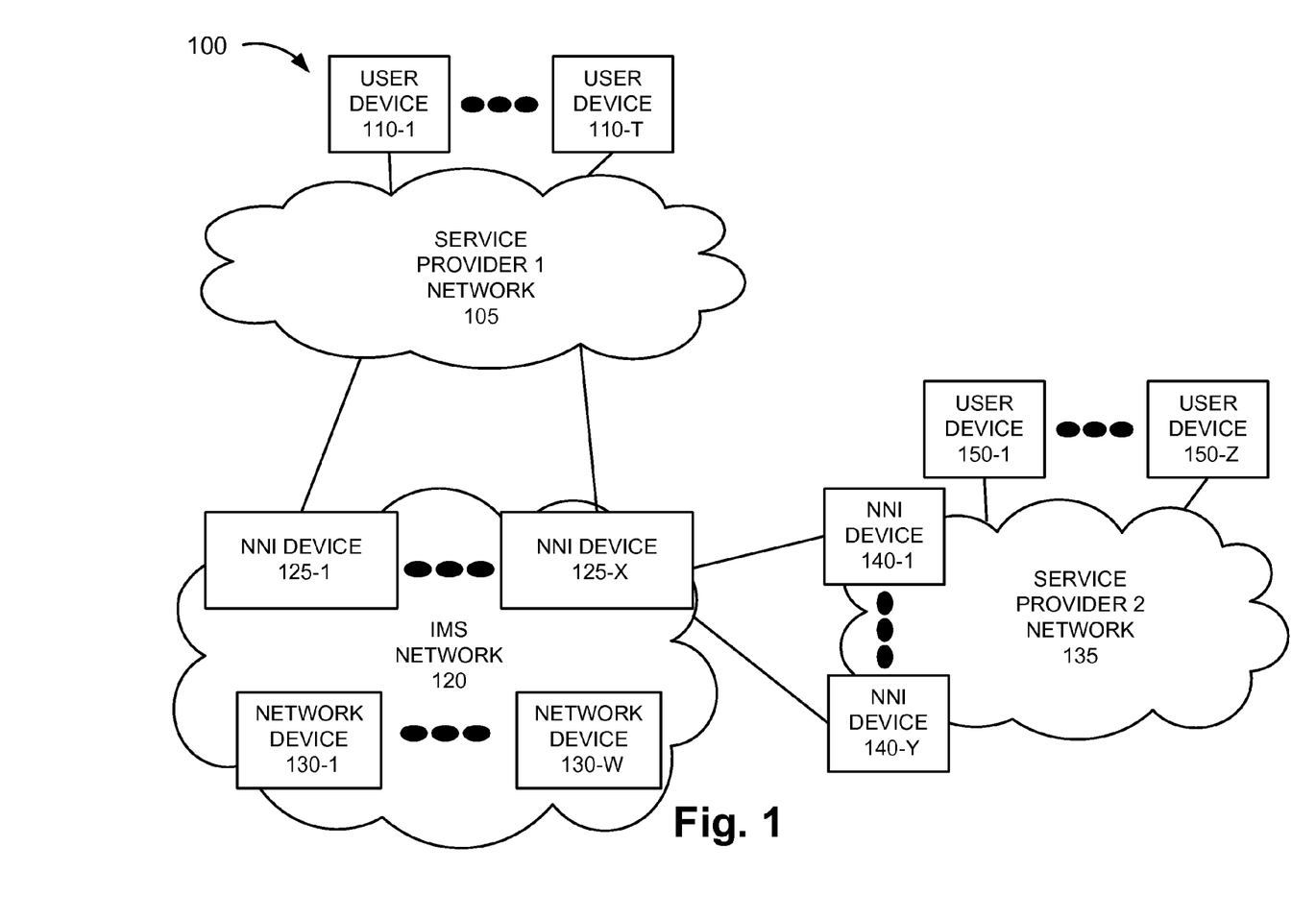
FIG. 1 is a diagram illustrating an exemplary environment in which an exemplary embodiment of selection of network-to-network interface devices may be implemented.

FIG. 1 is a diagram illustrating an exemplary environment in which an exemplary embodiment of selection of network-to-network interface devices may be implemented. As illustrated, an environment 100 includes a service provider 1 network 105, an IMS network 120 that includes network-to-network interface (NNI) devices 125-1 through 125-X, in which X>1 (also referred to individually as NNI device 125 and collectively as NNI devices 125) and network devices 130-1 through 130-W, in which W>1 (also referred to individually as network device 130 and collectively as network devices 130), and a service provider 2 network 135 that includes NNI 140-1 through 140-Y, in which Y>1 (also referred to individually as NNI device 140 and collectively as NNI devices 140). Environment 100 also includes user devices 110-1 through 110-T, in which T>1 (also referred to individually as user device 110 and collectively as user devices 110), and user devices 150-1 through 150-Z, in which Z>1 (also referred to individually as user device 150 and collectively as user devices 150).

The number of devices and networks, and the configuration in environment 100 are exemplary. According to other embodiments, environment 100 may include additional devices, fewer devices, different devices, and/or differently arranged devices, than those illustrated in FIG. 1. For example, service provider 1 network 105 may include network-to-network interface device(s). Additionally, or alternatively, environment 100 may include additional networks.

A device may be implemented according to one or multiple network architectures (e.g., a client device, a server device, a peer device, a proxy device, or a combination thereof). Networks may be implemented as peering networks. The networks may belong to different service providers, may belong to the same service provider, may use different technologies, etc. Also, according to other embodiments, one or more functions and/or processes described as being performed by a particular device may be performed by a different device, or some combination of devices, which may or may not include the particular device.

Environment 100 may be implemented to include wired and/or wireless connections among the devices and networks illustrated. A connection may be direct or indirect and may involve intermediary device(s) and/or network(s) not illustrated in FIG. 1. Additionally, the number and the arrangement of connections between the devices and the networks are exemplary.

Service provider 1 network 105 includes a network that interconnects to IMS network 120. Service provider 1 network 105 may be implemented as, for example, a wide area network (WAN), a metropolitan network (MAN), a wireless network, a data network, a public network, a private network, a CDMA network, a GSM network, GPRS network, UMTS network, a $3^{rd}$ Generation (3G) network, a $2^{nd}$ Generation (2G) network, a $4^{th}$ Generation (4G) network, an IP network, a WiFi network, a VoIP network, a TISPAN network, or various combinations thereof, etc. Service provider 2 network 135 includes a network that interconnects to IMS network 120. Service provider 2 network 135 may be implemented in a manner similar to service provider 1 network 105. IMS network 120 includes an IMS network. IMS network 120 is further described in FIG. 2 and elsewhere in this description.

As illustrated in FIG. 1, NNI device 125 provides interconnection and interworking services between networks. For example, NNI device 125 provides interconnection and interworking services between service provider 1 network 105 and IMS network 120 and between IMS network 120 and service provider 2 network 135. NNI device 125 may be implemented by using a Session Border Controller (SBC) or similar devices, such as an Interconnection Border Function (IBCF), an Interconnection Border Gateway Function (IBGF), a Transition Gateway (TrGW), a Border Control Function (BCF), a Border Gateway Function (BGF), a Media Gateway Control Function (MGCF), a Media Gateway (MGW), etc. For example, NNI device 125 may be implemented as an SBC device that performs some or all of the functions normally found in an IBCF for signaling control and a TrGW for media bearer control function. According to another example, NNI device 125 may be implemented as a stand-alone IBCF and TrGW or similar border gateway element(s). For description purposes, an IBGF and a TrGW are considered inter-exchangeable.

According to an exemplary embodiment, NNI device 125 adds an identifier to a message received from a device outside of IMS network 120. The identifier is a unique identifier that identifies NNI device 125. According to an exemplary embodiment, the message is a signaling message to establish a communication session. For example, the signaling message may pertain to a communication session, such as Voice Over IP (VoIP), Instant messaging (IM), video conferencing, or other types of real-time (e.g., gaming, etc.) or non-real-time applications (e.g., file transfers, etc.). The signaling message may be implemented as a SIP message in which NNI device 125 adds the identifier in a SIP header. For example, the SIP header may be a proprietary SIP header. According to other implementations, the signaling message may be implemented according to other signaling protocols, such as H.323, etc. According to an exemplary embodiment, NNI device 125 removes the identifier when acting as an egress NNI device 125 so that the added SIP header and identifier is not sent outside of IMS network 120. According to another exemplary embodiment, NNI device 125 does not remove the identifier since the SIP header may be ignored by other devices. NNI device 125 is described further below.

Network device 130 includes a network device that provides a function associated with the IMS architecture according to 3GPP standards. For example, referring to FIG. 2, network devices 130 may include network elements, such as an Interrogating Call Session Control Function (I-CSCF) 205, a Serving Call Session Control Function (S-CSCF) 210, a Home Subscriber Server (HSS) 215, an Application Server (220), a Proxy Call Session Control Function (P-CSCF) 225, an Interconnection Border Control Function (IBCF) 230, and a Transition Gateway (TrGW) 235, as well as other elements of the IMS architecture (e.g., a Media Resource Function (MRF), etc.). According to other implementations, network devices 130 may include additional elements, fewer elements, and/or different elements. Additionally, according to an exemplary implementation, network device 130 may include one or multiple network elements. According to an exemplary implementation, a Session Border Controller (SBC) may be deployed at NNI device 125 to perform both the signaling function of the IBCF 230 and the media function of the TrGW 235. TrGW 235 is also known as the Interconnect Border Gateway Function (IBGF) in other standards, such as TISPAN standards for cable companies.

Figure 2:
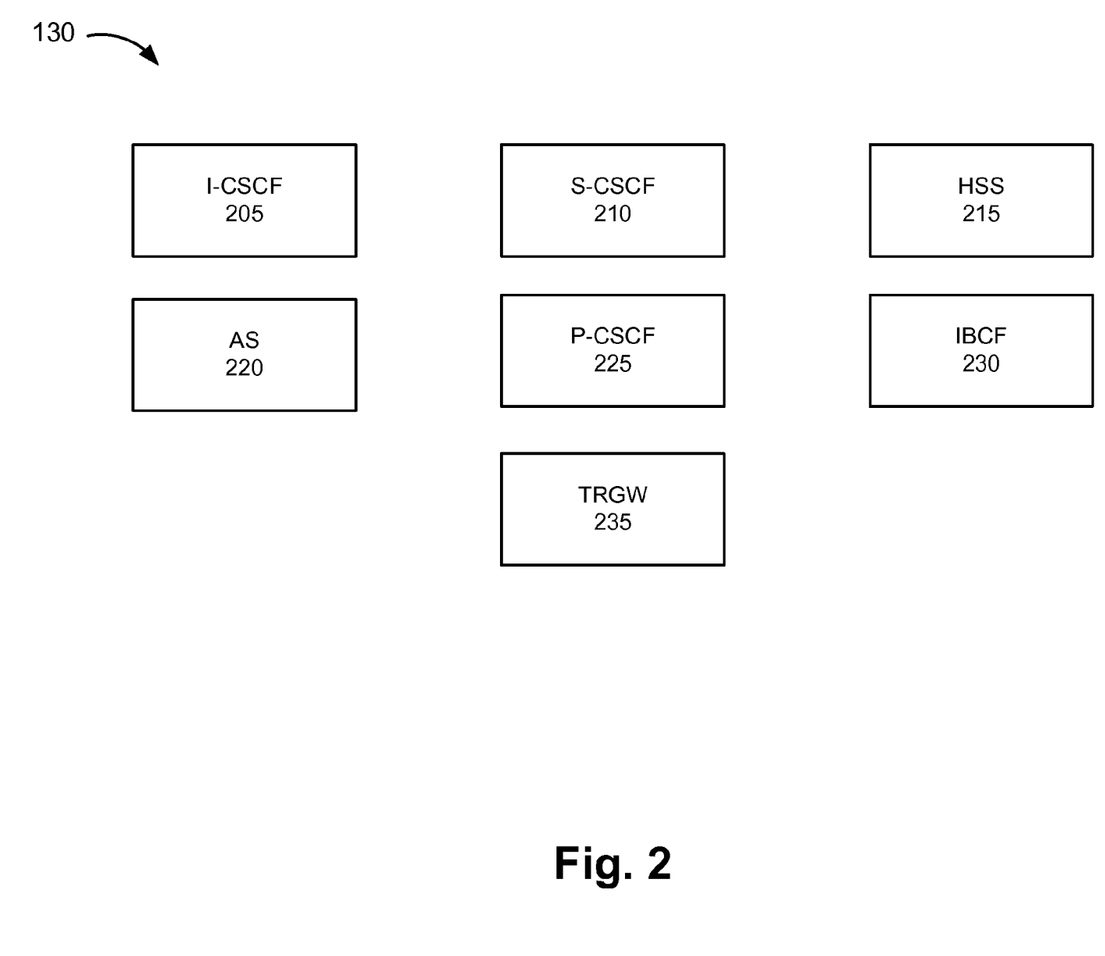
FIG. 2 is a diagram illustrating exemplary elements of the IMS network depicted in FIG. 1.

I-CSCF 205, HSS 215, AS 220, P-CSCF 225, IBCF 230, TrGW 235 may operate according to an IMS standard. AS 220 may host various communication session-related applications, such as, real-time applications (e.g., VoIP, video conferencing, messaging, gaming, etc.) and/or non-real-time applications.

According to an exemplary embodiment, NNI device 125 includes IBCF 230 for the signaling function and a TrGW for the media function. According to another embodiment, NNI device 125 may not include IBCF 230 or TrGW 235 but other network border control functions. In contrast to existing approaches in which an S-CSCF randomly selects an egress NNI device to establish a communication session to a network, according to an exemplary embodiment, S-CSCF 210 selects an egress NNI device 125 based on the identifier of the ingress NNI device 125 included in a signaling message. For example, the signaling message may be a session/call establishment request originating from a network outside of the IMS network. According to an exemplary embodiment, S-CSCF 210 removes the SIP header that includes the identifier before sending the signaling message to egress NNI device 125. According to another exemplary embodiment, S-CSCF 210 does not remove the SIP header that includes the identifier since the SIP header may be ignored by other devices. S-CSCF 210 is described further below. Alternatively, NNI device 140, which provides the interconnection and interworking function in service provider 2 network 135, may remove the SIP header with the identifier before forwarding the signaling message to network 135.

User device 110 includes a device having the capability to communicate with a network. For example, user device 120 may be implemented as a landline telephone, a cordless phone, a smartphone, a wireless telephone, an IP telephone, a Web access device, a personal digital assistant (PDA), a personal communication system (PCS) terminal, a pervasive computing device, a computer, and/or some other type of portable device, mobile device, handheld device, stationary device, vehicle-based device, etc. Additionally, or alternatively, user device 110 may be implemented as a machine-to-machine device. For example, user device 110 may be implemented as an entertainment device, a security device of a security system, a kiosk device, etc. User device 110 may operate according to one or more wireless and/or wired network standards. User device 150 may include a device similar to those described for user device 110.

Figure 3A:
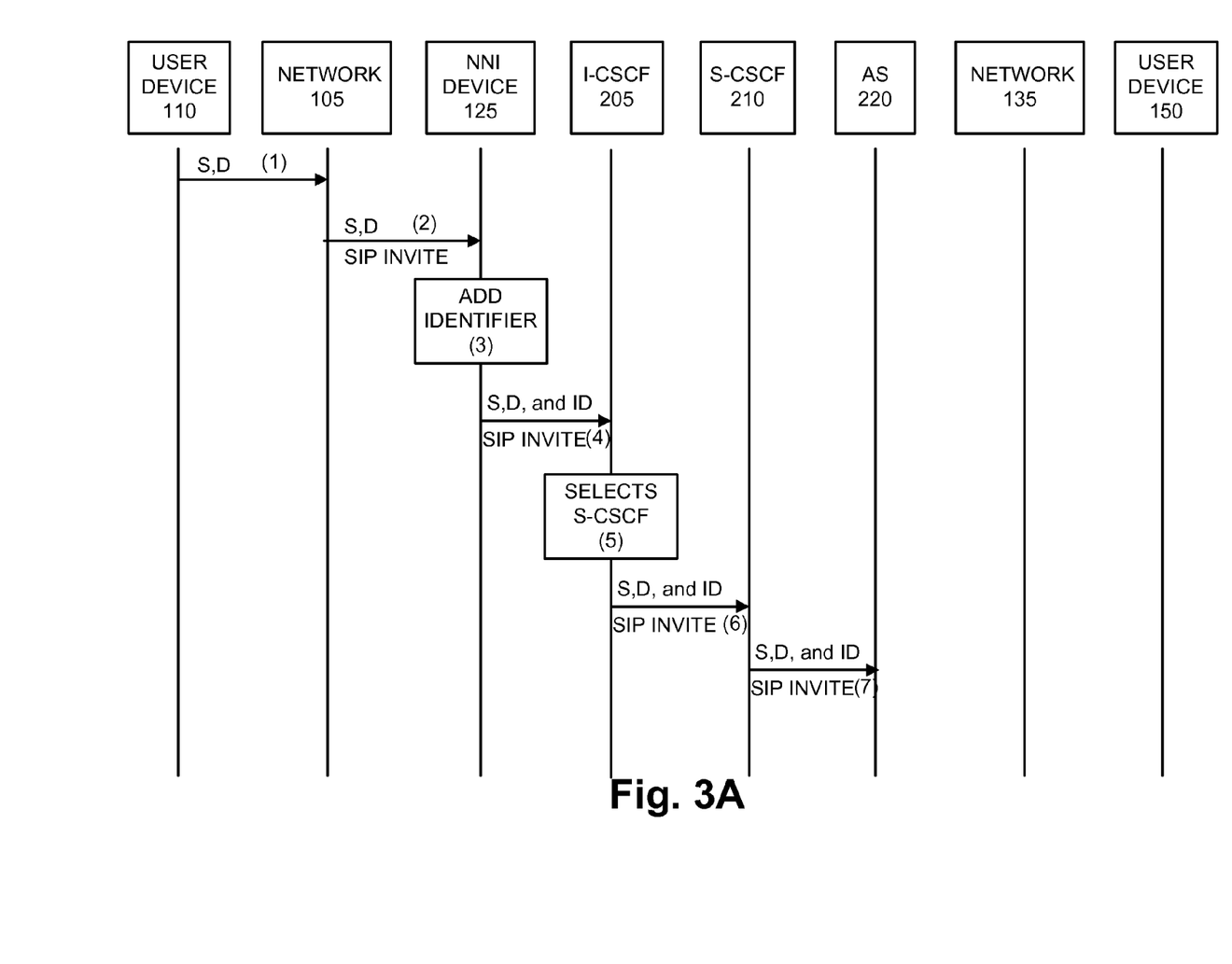
FIGS. 3A and 3B are diagrams illustrating an exemplary messaging flow pertaining to an exemplary embodiment of selection of a network-to-network interface device.
Figure 3B:
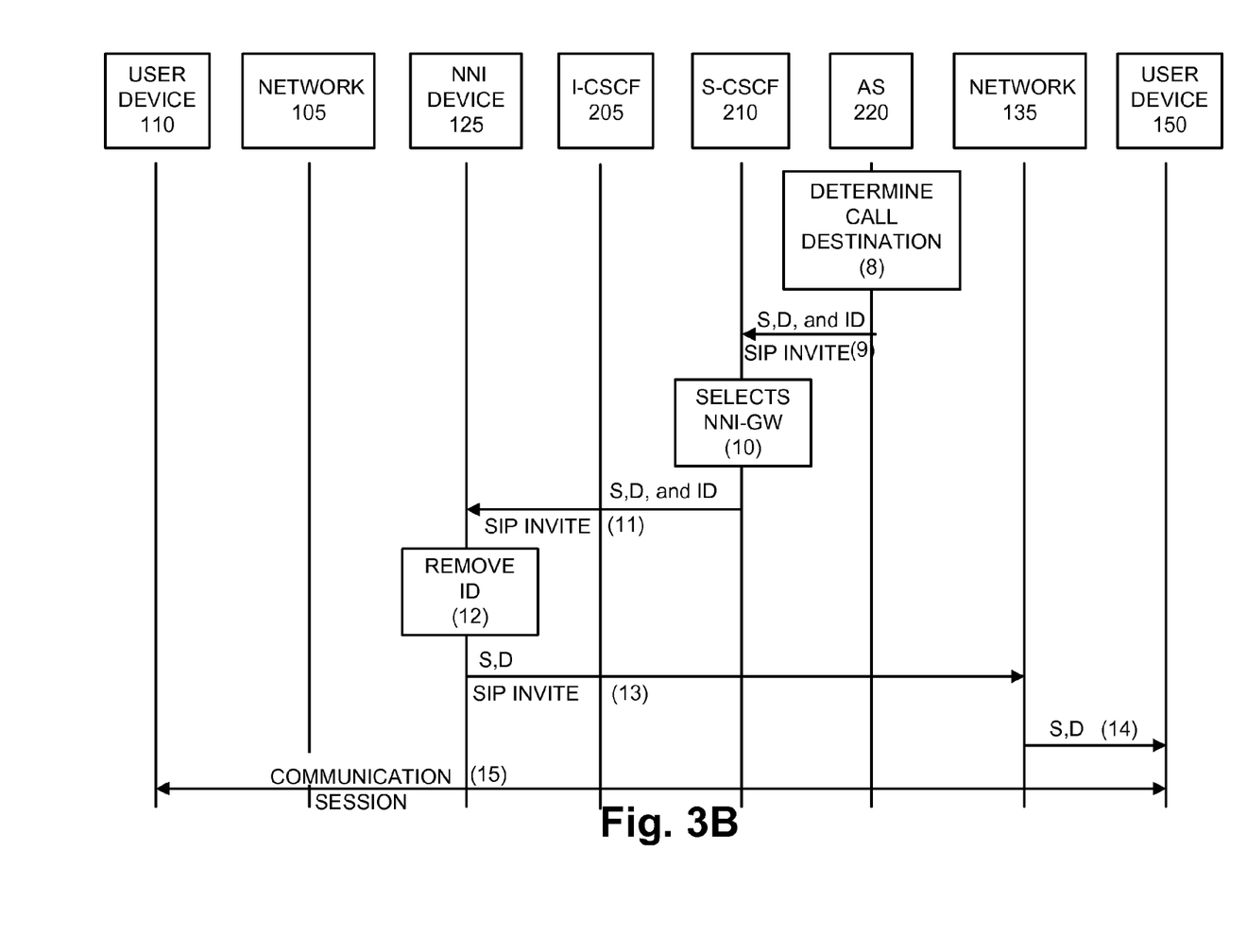

FIGS. 3A and 3B are diagrams illustrating an exemplary process to select an egress network-to-network interface device. The exemplary process is described in relation to the devices illustrated in FIGS. 1 and 2. For example, assume that user device 110 is establishing a communication session with a user of the IMS network 120 who has forwarded incoming communication sessions to user device 150. According to another example, the user of user device 150 is a subscriber of IMS network 120, but the user is currently roaming and using network 135.

The messages and the data or information included therein are merely exemplary. According to other implementations, the process may use different types of messages and/or include different data or information. Additionally, or alternatively, although the exemplary process describes a particular device performing a step or an act of the process, the step or act may be performed by another device, or some combination of devices.

Referring to FIG. 3A, in step (1), user device 110 transmits an SS7 initial address message (IAM) that includes source and destination addresses, which are depicted as "S" and "D". In step (2), service provider 1 network 105 receives the initial address message and determines that the contacted user, based on the destination address, resides in IMS network 120. According to this example, service provider 1 network 105 converts the initial address message to a SIP Invite message and transmits the SIP Invite message to NNI device 125, which operates as an ingress NNI device 125 for IMS network 120. If network 105 and network 120 belong to different network operators, network 105 may deploy a peering NNI device (not illustrated) to communicate with NNI device 125 in IMS network 120.

In step (3), NNI device 125 adds an identifier, which identifies NNI device 125, to the SIP Invite message. For example, NNI device 125 adds a SIP header that includes the identifier. For example, the SIP header is called P-COM.NNI-ID. As set forth in the SIP standard, unknown headers should be ignored. In this way, other devices in IMS network 120 that receive the SIP Invite message with the additional header and do not understand the added header, should simply ignore the SIP header that includes the identifier. For example, the SIP Invite message may be received by I-CSCF 205 and AS 220. I-CSCF 205 and AS 220 may ignore the added SIP header.

In step (4), NNI device 125 transmits the SIP Invite that includes the identifier, which is depicted as "ID", to I-CSCF 205. In step (5), I-CSCF 205 selects S-CSCF 210 to further process the signaling message. In step (6), I-CSCF 205 transmits the SIP Invite that includes the identifier to S-CSCF 210. In step (7), S-CSCF 210 selects an AS 220 to further process the signaling message and transmits the SIP Invite that includes the identifier to AS 220.

Referring to FIG. 3B, in step (8), AS 220 processes the SIP Invite. For example, AS 220 may obtain a user profile pertaining to the contacted user, as identified in the SIP Invite message, from HSS 215. Based on the contacted user's user profile, AS 220 may decide to allow the signaling message to be delivered to the original called user, may change the destination in the request URI (R-URI) of the SIP Invite to redirect the signaling message to another user or destination (e.g., in a call forwarding scenario), may block the SIP Invite (e.g., in a call blocking scenario), etc. According to this scenario, AS 220 transmits the SIP Invite with the R-URI identifying user device 150, which may belong to a subscriber of network 120 roaming in network 135 at that time or a subscriber belonging to network 135, to S-CSCF 210. In step (10), S-CSCF 210 determines whether the SIP Invite is to be terminated in IMS network 120 or another network by analyzing the address included in the R-URI of the SIP Invite. For example, S-CSCF 210 may perform an ENUM lookup of a telephone number included in the R-URI or may look up the domain name included in the R-URI to determine where to route the SIP Invite. According to this scenario, S-CSCF 210 determines that the SIP Invite is to be routed to another network (e.g., service provider 2 network 135).

As illustrated in FIG. 3B, S-CSCF 210 selects an egress NNI device 125. According to an exemplary embodiment, S-CSCF 210 selects an egress NNI device 125 based on routing information correlated to the identifier of ingress NNI device 125. For example, S-CSCF 210 may store this information in an on-board routing table or database with pre-configured information or query an external routing table or database that has the required routing information. S-CSCF 210 uses the identifier to identify NNI device 125 as the ingress NNI device 125 and selects an egress NNI device 125 that is suitable for the communication session and minimizes the physical distance between ingress and egress NNI device(s) 125. According to another embodiment, S-CSCF 210 uses the identifier to select an egress NNI device 125 that minimizes the path length from the ingress NNI device 125 to service provider 2 network 135 via an egress NNI device 125.

Figure 4A:
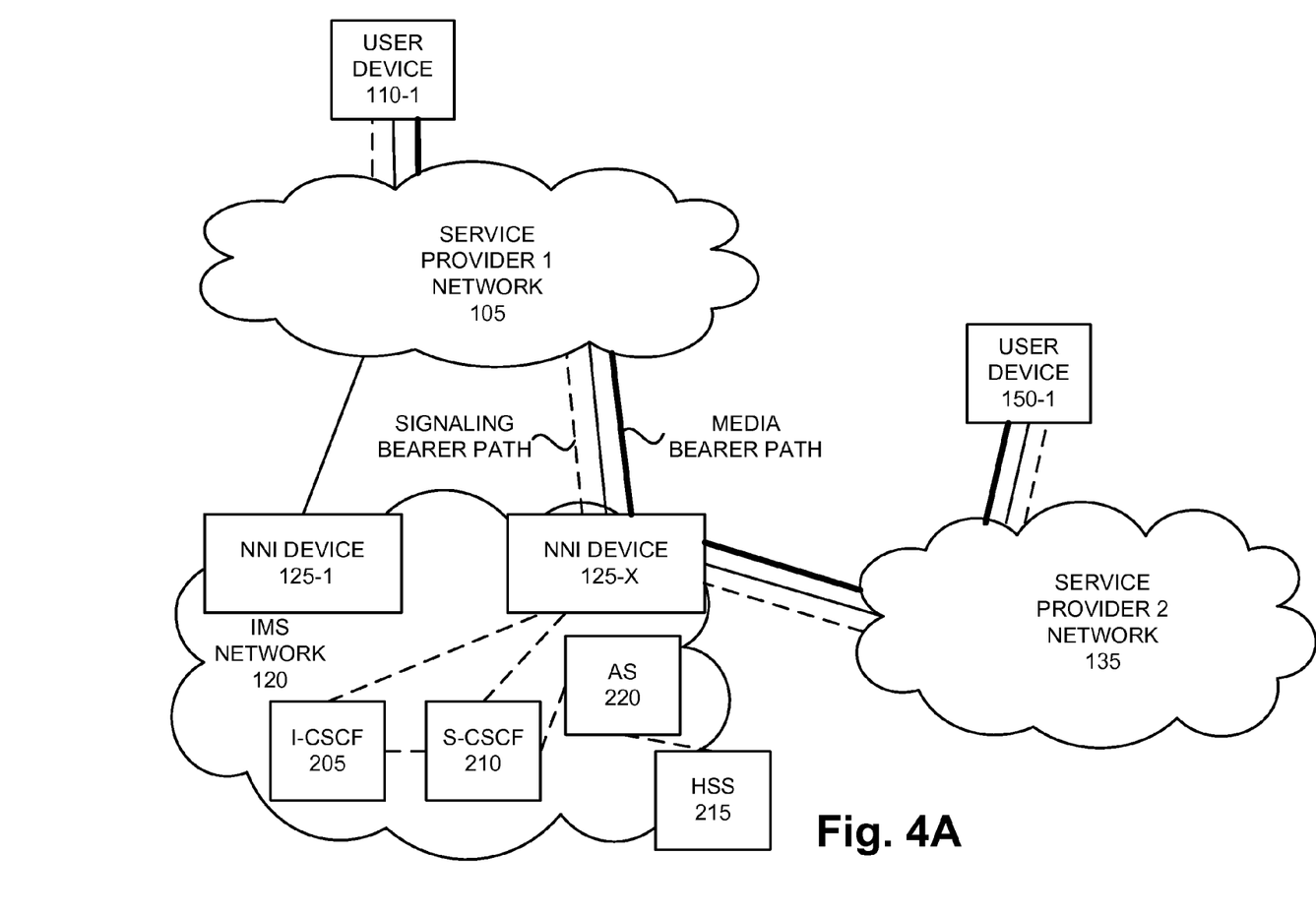
FIGS. 4A and 4B are diagrams illustrating signal and bearer paths pertaining to the selection of a network-to-network interface device.

As an example, referring to FIG. 1, assume that the ingress NNI device that originally received the SIP Invite was NNI device 125-X. Also assume that based on a routing table, S-CSCF 120 determines that NNI device 125-X is a suitable egress NNI device 125. S-CSCF 210 selects NNI device 125-X as the egress NNI device 125. For example, referring to FIG. 4A, the dotted lines indicate the signaling bearer path and the heavy solid lines indicate the media bearer path. According to an exemplary embodiment, when the ingress NNI device 125 is the same as the egress NNI device 125, NNI device 125 includes logic to establish the media bearer path from the incoming port associated with an originating network (e.g., service provider 1 network 105) to the outgoing port associated with the termination network (e.g., service provider 2 network 135).

Referring back to FIG. 1, according to another scenario, network device 130 (e.g., S-CSCF 210) selects an egress NNI device 125 that is different from the ingress NNI device 125.

Figure 4B:
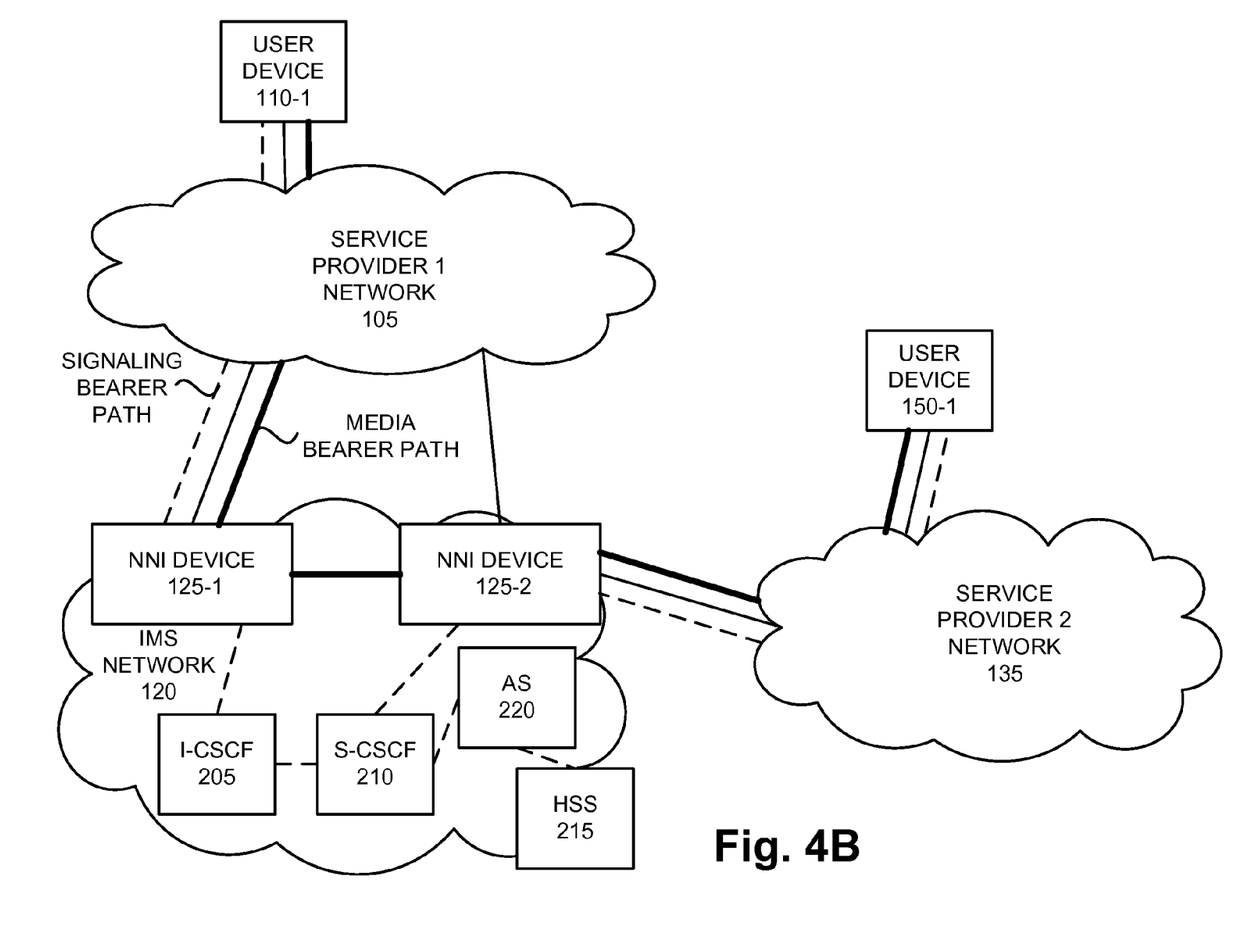

For example, referring to FIG. 4B, the dotted lines indicate the signaling bearer path and the heavy solid lines indicate the media bearer path. In comparison with FIG. 4A, two more ports may be required for the interconnection between the two NNI devices 125. According to this scenario, NNI device 125-1 is the ingress NNI device and NNI device 125-2 is the egress NNI device. NNI device 125-1 and NNI device 125-2 establish a connection for the bearer path between them. In either of these scenarios, the path length between ingress NNI device 125 and egress NNI device 125 is minimized.

Referring to FIG. 3B, in step (11), S-CSCF 210 transmits the SIP Invite that includes the identifier to the egress NNI device 125. For description purposes, as illustrated in FIG. 3B for step (11), NNI device 125 may serve as the ingress and the egress NNI device 125 or NNI device 125 may be a separate NNI device than the ingress NNI device 125 previously described. In step (12), NNI device 125 removes the identifier from the SIP Invite and, in step (13), transmits the SIP Invite to service provider 2 network 135. In step (14), service provider 2 network 135 sends the SIP Invite to user device 150. In step (15), a communication session is established between user device 110 and user device 150. The bearer path traverses the ingress and the egress NNI device(s) 125.

While FIGS. 3A and 3B are diagrams illustrating an exemplary process to select an egress network-to-network interface device that minimizes the physical distance or path length from an ingress network-to-network interface device, according to other scenarios, the message(s) transmitted and/or received may be different, and/or the step(s) or act(s) described may be different. By way of example, according to a scenario, in step (10), in which S-CSCF 210 determines that the SIP Invite remains in IMS network 120 or that an egress NNI device 125 is not needed, S-CSCF 210 may ignore the identifier. Also, according to other implementations, S-CSCF 210 may remove the identifier at step (10). According to yet another scenario, if S-CSCF 210 does not find the identifier in the SIP Invite, according to an exemplary embodiment, S-CSCF 210 may use other well-known methods (e.g., round robin) to select an egress NNI device 125. According to another exemplary scenario, AS 220 determines that the SIP Invite is to be routed to another network (e.g., service provider 2 network 135) instead of S-CSCF 210.

Figure 5:
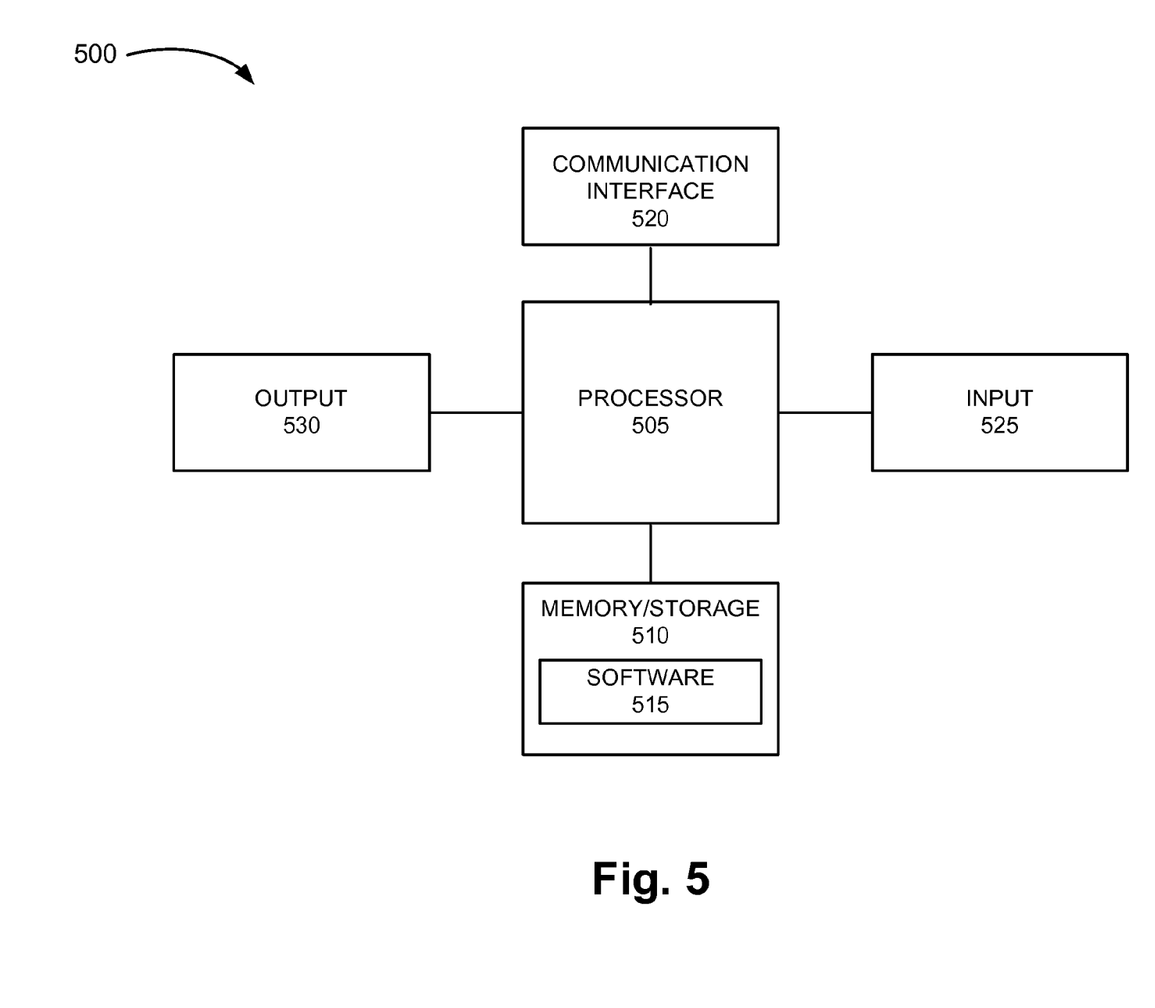
FIG. 5 is a diagram illustrating exemplary components of a device that may correspond to one or more of the devices depicted in FIGS. 1 and 2.

FIG. 5 is a diagram illustrating exemplary components of a device 500 that may correspond to one or more of the devices depicted in the previous figures. As illustrated, according to an exemplary embodiment, device 500 includes a processor 505, memory/storage 510, software 515, a communication interface 520, an input 525, and an output 530. According to other embodiments, device 500 may include fewer components, additional components, different components, and/or a different arrangement of components than those illustrated in FIG. 5 and described herein.

Processor 505 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., memory/storage 510), etc.

Processor 505 may control the overall operation or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., a network, another device, etc.).

Memory/storage 510 may include one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 may include an application or a program that provides a function and/or a process. Software 515 may include firmware. For example, user device 110 may be implemented with one or more program(s) and/or application(s). Additionally, for example, one or more program(s) and/or application(s) may be used to display user interfaces, communicate with other devices, etc. Additionally, for example, other devices may be implemented with software 515 to provide a function and/or a process described herein.

Communication interface 520 may permit device 500 to communicate with other devices, networks, systems, etc. Communication interface 520 may include one or multiple wireless interfaces and/or wired interfaces. Communication interface 520 may include one or multiple transmitters, receivers, and/or transceivers. Communication interface 520 may operate according to one or multiple protocols, standards, and/or the like.

Input 525 may permit an input into device 500. For example, input 525 may include a keyboard, a keypad, a mouse, a display, a touchscreen, a touchless screen, a button, a switch, an input port, speech recognition logic, and/or some other type of visual, auditory, tactile, etc., input component. Output 530 may permit an output from device 500. For example, output 530 may include a speaker, a display, a touchscreen, a touchless screen, a light, an output port, and/or some other type of visual, auditory, tactile, etc., output component.

Device 500 may perform processes and/or functions, as described herein, in response to processor 505 executing software 515 stored by memory/storage 510. By way of example, instructions may be read into memory/storage 510 from another memory/storage 510 or from another device via communication interface 520. The instructions stored by memory/storage 510 may cause processor 505 to perform one or more processes described herein. Alternatively, for example, according to other implementations, device 500 may perform one or more processes described herein based on the execution of hardware (e.g., processor 505).

Figure 6:
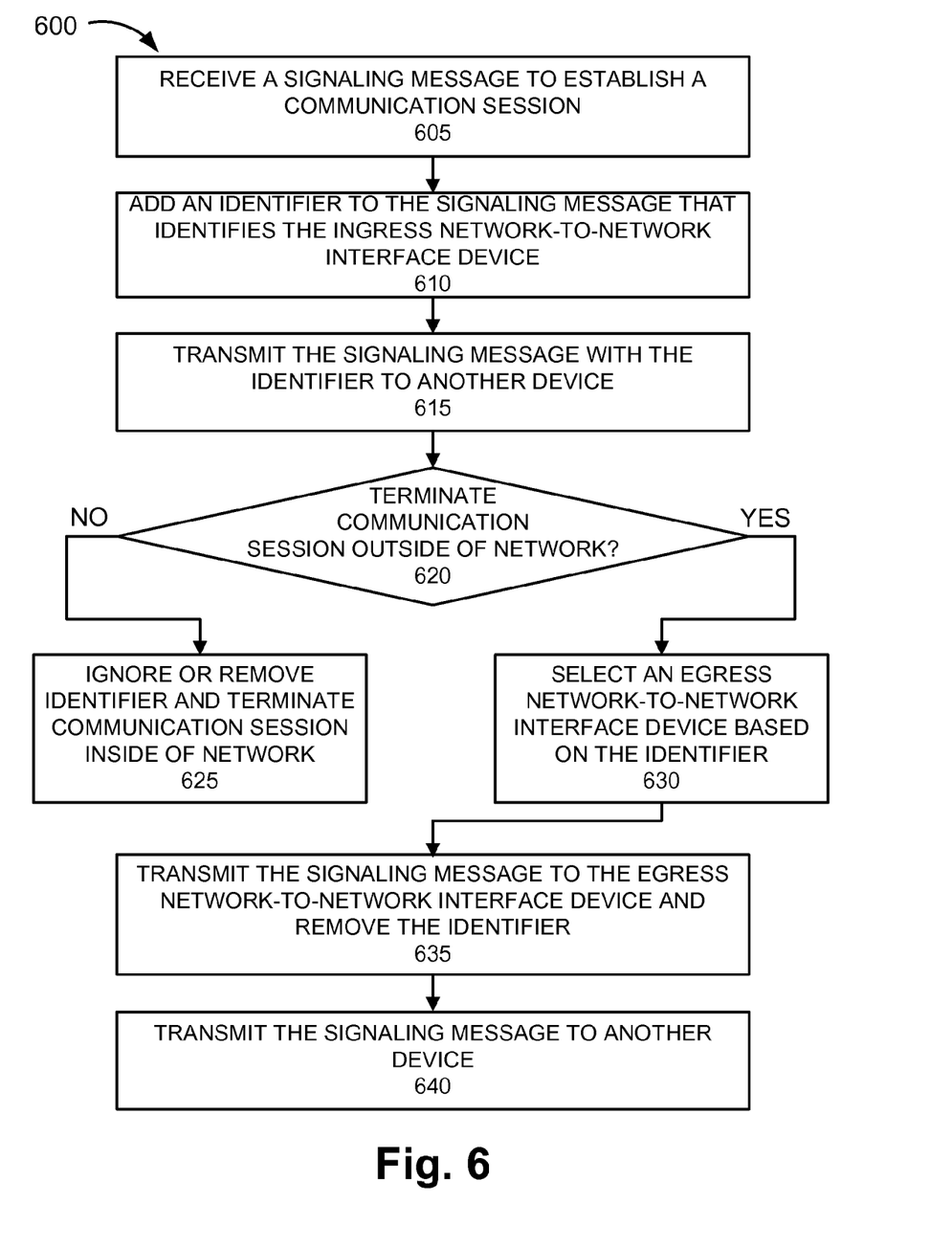
FIG. 6 is a flow diagram illustrating an exemplary process for selecting an egress network-to-network interface device.

FIG. 6 is a flow diagram illustrating an exemplary process 600 for selecting an egress network-to-network interface device. A step or an act described in process 600 is performed by one of the devices illustrated in FIG. 1. For example, a step or an act of process 600 may be performed by NNI device 125 in which processor 505 executes software 515 to perform the step described. Alternatively, for example, a step or an act of process 600 may be performed by network device 130 (e.g., S-CSCF 210) in which processor 505 executes software 515 to perform the step described.

Process 600 begins with receiving a signaling message to establish a communication session (block 605). For example, ingress NNI device 125 receives a SIP Invite message, from another network, to establish a communication session. The communication session may pertain to a real-time communication session or a non-real time communication session.

In block 610, an identifier, which identifiers the ingress network-to-network interface device, is added to the signaling message. For example, ingress NNI device 125 adds a unique identifier to the SIP Invite message. For example, ingress NNI device 125 adds a SIP header that includes the identifier.

In block 615, the signaling message is transmitted to another device. For example, NNI device 125 transmits the SIP Invite that includes the identifier to another network device 130 of IMS network 120. For example, network device 130 includes I-CSCF 205 and/or AS 220.

In block 620, it is determined whether the communication session terminates outside of the network. For example, network device 130 (e.g., S-CSCF 210 or AS 220) determines if the communication session is to terminate within or outside of IMS network 120 based on a destination of the SIP Invite message. By way of further example, network device 130 determines if a terminated user is served by IMS network 120 or another network.

If it is determined that the communication session is to be terminated inside the network (block 620-NO), then the identifier is ignored or removed and the communication session is terminated inside of the network (block 625). For example, network device(s) 130 of IMS network 120 process and/or terminate the SIP Invite message within IMS network 120.

If it is determined that the communication session is to be terminated outside of the network (block 620-YES), then an egress network-to-network interface device is selected based on the identifier (block 630). For example, network device 130 (e.g., S-CSCF 210) selects an egress NNI device 125 based on the identifier included in the SIP Invite message.

As previously described, according to an exemplary embodiment, network device 130 uses routing information or a database that correlates the identifier to minimize the physical distance of a signaling path, minimize the physical distance of a media path, optimize other network performance metrics, and/or optimize the use of network resources. For example, network device 130 selects an egress NNI device 125 that minimizes the media path between ingress NNI device 125 and egress NNI device 125. According to another exemplary embodiment, network device 130 selects an egress NNI device 125 that minimizes the physical distance of the connection between an egress network-to-network interface device in the originating network (e.g., IMS network 120) to the ingress network-to-network interface device in a terminating network (e.g., network 135). According to another exemplary embodiment, network device 130 selects an egress NNI device 125 that minimizes the physical distance of the connection between an ingress NNI device in the originating network (e.g., IMS network 120) and the ingress NNI device in the terminating network (e.g., network 135) via an egress NNI interface device 125 in the originating network (e.g., IMS network 120).

In block 635, the signaling message is transmitted to the egress network-to-network interface device. For example, network device 130 (e.g., S-CSCF 210) transmits the SIP Invite to egress NNI device 125. According to an exemplary implementation, network device 130 removes the identifier. According to another implementation, egress NNI device 125 removes the identifier when the SIP Invite is received.

In block 640, the signaling message is transmitted to another network. For example, egress NNI device 125 transmits the SIP Invite message to NNI device 140 in network 135. According to a scenario in which the ingress NNI device 125 is the same as the egress NNI device 125, NNI device 125 may provide a bearer path connection from an incoming port, connecting network 105, to an outgoing port, connecting to network 135 in some implementations. In other implementations, an outgoing port and an incoming port may loop around in a hair-pin manner at NNI device 125 so that there are two incoming ports and two outgoing ports used in the bearer path.

Although FIG. 6 illustrates an exemplary process 600 for selecting a network-to-network interface device, process 600 may include additional operations, fewer operations, and/or different operations than those illustrated in FIG. 6 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel. For example, a step, an act, or an operation described as being performed by a network element of the IMS architecture may, in other embodiments, be performed by some other network element or combination of network elements. For example, an operation described as being performed by S-CSCF 210 may be performed by another network element.

The embodiments described herein may be implemented in many different forms of software, firmware, and/or hardware. For example, a process or a function may be implemented as "logic" or as a "component." This logic or this component may include hardware (e.g., processor 505, etc.) and/or a combination of hardware and software (e.g., software 515). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 510.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method comprising:
   receiving, by an ingress network-to-network interface device of a network, a signaling message to establish a communication session, wherein the signaling message is received from a network device of a first network, and wherein the network is an Internet Protocol Multimedia Subsystem network;
   adding, by the ingress network-to-network interface device, an identifier, which identifies the ingress network-to-network interface device, to the signaling message;
   transmitting, by the ingress network-to-network interface device, the signaling message that includes the identifier to another device of the network to which the ingress network-to-network interface device belongs, wherein the other device includes a server device that provides session control for the communication session;
   receiving, by the other device, the signaling message that includes the identifier or a modified signaling message that includes the identifier;
   selecting, by the other device, an egress network-to-network interface device of the network based on the identifier and a minimum path criterion between the ingress network-to-network interface device and the egress network-to-network interface device; and
   transmitting, by the other device, the signaling message or the modified signaling message to the egress network-to-network interface device.

2. The method of claim 1, further comprising:
   removing the identifier from the signaling message or the modified signaling message before transmitting the signaling message or the modified signaling message to the egress network-to-network interface device.

3. The method of claim 1, wherein the signaling message includes a Session Initiation Protocol (SIP) message, and wherein the adding comprises:
   adding a SIP header, which includes the identifier, to the SIP message.

4. The method of claim 1, further comprising:
   determining whether the signaling message or the modified signaling message is to terminate within the network based on a destination address associated with the signaling message or the modified signaling message.

5. The method of claim 1, further comprising:
   receiving, by the ingress network-to-network interface device of the network, another signaling message to establish another communication session;
   adding, by the ingress network-to-network interface device, the identifier to the other signaling message;
   transmitting, by the ingress network-to-network interface device, the other signaling message that includes the identifier, to the other device of the network;
   selecting, by the other device, the egress network-to-network interface device based on the identifier and a minimum path criterion between the ingress network-to-network interface device and an ingress network-to-network interface device of a second network; and
   transmitting the signaling message to the ingress network-to-network device of the second network via the egress network-to-network interface device of the network.

6. The method of claim 1, further comprising:
   obtaining user profile information pertaining to a user to which the signaling message is directed; and
   determining whether the signaling message is to be modified based on the user profile information, wherein a modification of the signaling message includes changing a destination of the signaling message or blocking the signaling message.

7. The method of claim 1, wherein the ingress network-to-network interface device and the egress network-to-network interface device is the same device, and wherein the ingress network-to-network interface device includes one of a border device or a gateway device.

8. The method of claim 1, further comprising:
   storing routing information that correlates to the identifier; and wherein the selecting comprises:
   selecting the egress network-to-network interface device based on the routing information and the identifier.

9. A network comprising:
   an ingress network-to-network device of the network comprising:
     a first communication interface;
     a first memory to store first instructions; and
     a first processor to execute the first instructions to:
       receive, via the first communication interface, a signaling message pertaining to a communication session;
       add an identifier, which identifies the ingress network-to-network device, to the signaling message;
       transmit, via the first communication interface, the signaling message that includes the identifier; and
   a network device of the network comprising:
     a second communication interface;
     a second memory to store second instructions; and
     a second processor to execute the second instructions to:
       receive, via the second communication interface, the signaling message that includes the identifier; and select an egress network-to-network device of the network based on the identifier and a minimum path criterion between the ingress network-to-network device and the egress network-to-network device, wherein the network device includes a server device that provides session control for the communication session, wherein the network is an Internet Protocol Multimedia Subsystem network.

10. The network of claim 9, wherein the signaling message includes a Session Initiation Protocol (SIP) message.

11. The network of claim 10, wherein the communication session pertains to a real-time application including one of Voice over Internet Protocol, Instant Messaging, or Video delivery.

12. The network of claim 9, wherein the network device includes a Call Session Control Function.

13. The network of claim 9, wherein the second processor to execute the second instructions to:
determine whether the signaling message is to terminate within the network based on a destination address associated with the signaling message.

14. The network of claim 9, further comprising:
the network-to-network interface egress device comprising:
a third communication interface;
a third memory to store third instructions; and
a third processor to execute the third instructions to:
receive, via the third communication interface, the signaling message that includes the identifier;
remove the identifier; and
transmit, via the third communication interface, the signaling message to another network.

15. The network of claim 14, wherein the second processor to execute the second instructions to:
store routing information that correlates to the identifier; and wherein when selecting, the second processor to execute the second instructions to:
select the network-to-network egress device based on the routing information and the identifier.

16. The network of claim 9, wherein when adding, the first processor to execute the first instructions to:
add a header, which includes the identifier, to the signaling message.

17. A non-transitory storage medium storing instructions executable by a computational device of a network, wherein the instructions comprise instructions to:
receive a signaling message for establishing a communication session, wherein the signaling message includes an identifier of an ingress network-to-network device of the network, and wherein the network is an Internet Protocol Multimedia Subsystem network; and
select an egress network-to-network device of the network based on the identifier and a minimum path criterion between the ingress network-to-network device and the egress network-to-network device, wherein the computational device includes a server device that provides session control for the communication session.

18. The non-transitory storage medium of claim 17, wherein the instructions comprise further instructions to:
determine whether the signaling message is to terminate outside of the network of the computational device.

19. The non-transitory storage medium of claim 17, wherein the instructions comprise further instructions to:
store routing information that correlates to the identifier; and wherein when selecting, the instructions comprise further instructions to:
select the egress network-to-network device based on the routing information and the identifier.

20. The non-transitory storage medium of claim 17, wherein the instructions comprise further instructions to:
remove the identifier from the signaling message; and
transmit the signaling message to the egress network-to-network device.

21. A method comprising:
receiving, by a network device of a network, a signaling message to establish a communication session, wherein the signaling message includes an identifier that identifies an ingress network-to-network interface device of the network through which the signaling message traversed, wherein the network device includes a server device that provides session control for the communication session, and wherein the network is an Internet Protocol Multimedia Subsystem network;
selecting, by the network device, an egress network-to-network interface device of the network through which the signaling message is to traverse, based on the identifier and a minimum path criterion; and
transmitting, by the network device, the signaling message to the egress network-to-network interface device.

22. The method of claim 21, further comprising:
removing the identifier from the signaling message before transmitting the signaling message to the egress network-to-network interface device.

23. The method of claim 21, wherein the minimum path criterion includes a shortest media bearer path between the ingress network-to-network interface device and the egress network-to-network interface device.

* * * * *